United States Patent [19]

Shiraishi et al.

[11] Patent Number: 4,881,019

[45] Date of Patent: Nov. 14, 1989

[54] WIPER CONTROL SYSTEM FOR AUTOMOTIVE VEHICLE FACILITATED FRONT AND REAR WIPERS

[75] Inventors: Yasuhiro Shiraishi, Sagamihara; Yoshinori Nagamine, Fujisawa, both of Japan

[73] Assignee: Nissan Motor Co., Ltd., Japan

[21] Appl. No.: 44,053

[22] Filed: Apr. 29, 1987

[30] Foreign Application Priority Data

Apr. 30, 1986 [JP] Japan .................................. 61-100570

[51] Int. Cl.⁴ ................................................. B60S 1/08
[52] U.S. Cl. ......................................... 318/68; 318/49; 318/DIG. 2; 318/444
[58] Field of Search ................... 318/49, DIG. 2, 443, 318/444, 68; 15/250 C, 250.12, 250.13, 250.17, 250.16, 250.27

[56] References Cited

U.S. PATENT DOCUMENTS

| | | | |
|---|---|---|---|
| 4,075,501 | 2/1978 | Kondo | 318/DIG. 2 X |
| 4,336,482 | 6/1982 | Goertler et al. | 318/443 |

FOREIGN PATENT DOCUMENTS

| | | | |
|---|---|---|---|
| 3021877 | 12/1981 | Fed. Rep. of Germany | 15/250.12 |
| 3044011 | 6/1982 | Fed. Rep. of Germany | 318/443 |
| 56-13239 | 2/1981 | Japan | |
| 1522521 | 8/1978 | United Kingdom | 318/DIG. 2 |
| 1561394 | 2/1980 | United Kingdom | 15/250.12 |

Primary Examiner—Bentsu Ro
Attorney, Agent, or Firm—Leydig, Voit & Mayer

[57] ABSTRACT

A wiper control system includes a rear wiper control circuit associated with a front wiper control circuit. The wiper drive signals generated in the front wiper control circuit are fed to the rear wiper control circuit. The rear wiper control circuit derives a rear wiper drive timing on the basis of the occurrences of the front wiper drive signals. The rear wiper driving frequency is generally lower than that of the front wiper driving frequency. The lower rate of the rear wiper driving frequency relative to the front wiper driving frequency is preferably variable depending upon the vehicle driving condition.

11 Claims, 3 Drawing Sheets

WIPER CONTROL SYSTEM FOR AUTOMOTIVE VEHICLE FACILITATED FRONT AND REAR WIPERS

BACKGROUND OF THE INVENTION

1. Field of the Invention

The present invention relates generally to a control system for driving an automotive windshield wiper with a desired timing. More specifically, the invention relates to a control for an automotive wiper which drives the automotive wiper with a desired intermittent timing. Most particularly, the invention relates to a control system for an automotive wiper system including a front windshield wiper and a rear windshield wiper.

2. Description of the Background Art

In recent years, a variety of automotive wiper systems have been developed. Some of there wiper systems include not only wipers for a front windshield but also wipers for a rear windshield. In the following disclosure, the wiper for the front windshield will be referred to as the "front wiper", the wiper for the rear windshield as the "rear wiper and the wiper system including both of the front and rear wipers as the "wiper system".

Usually, the control system for such wiper systems has independently operable switches for the front and rear wipers. The switch for the front wiper is generally switchable between a LOW speed mode position, a HIGH speed mode position, an INTERMITTENT mode position, a WASHER mode position and an OFF mode position. The switch for the rear wiper is switchable between an ON position and an OFF position. In such a wiper control system, the rear wiper is driven at low speed continuous mode while the associated switch is held in the ON position. Usually, the amount of the rain water on the rear windshield is much less than that on the front windshield. Especially while the vehicle is running, the amount of rain water on the rear windshield becomes less with increasing vehicle speed. Thus, the driver will usually switch the switch ON and OFF while observing the condition of the rear windshield. The attention required to operate the rear wiper without causing damage to the wiper blade or rear window pane clearly complicates driving.

To free the driver from the rear wiper control operation, it would be preferable to allow control by a single switch operation for selecting the wiper operation mode for the front wiper. Such a wiper control system which allows control of both of the front and rear wiper operation with a single switch has been proposed in Japanese Patent First (unexamined) Publication (Tokkai) Showa 56-13239. In the disclosed wiper control system, a common intermittent control circuit is used for controlling intermittent timing for the front and rear wipers. Therefore, the front and rear wipers are driven at the same intermittent timing. The intermittent timing is usually selected depending upon the rain condition and in view of rain water amount on the front windshield. While the vehicle is not running, the amount of the rain water amount on the front and rear windshield would be approximately equal and by selecting the intermittent timing in view of the amount of rain water on the front windshield, a thin water layer necessary for smooth operation of the wiper can be established on the rear windshield. However, while the vehicle is running, air flows along the external surface of the vehicle body and prevents rain drops from falling on the rear windshield. As a result, the rain water amount on the rear windshield becomes less than that on the front windshield. Even in this condition, in the prior art system, the front and rear wipers are driven at common intermittent timing. Therefore, the amount of water on the rear windshield becomes insufficient for establishing a thin water layer for smooth wiper operation. Failure to establish the water layer, results in higher friction between the wiper blade and the windshield surface, tends to cause scratches on the windshield surface and, in turn, accelerate wearing of the wiper blade, shortening wiper blade life.

SUMMARY OF THE INVENTION

Therefore, it is an object of the present invention to provide a wiper control system which can control drive timing of the rear wiper to be different from that of the front wiper.

Another object of the invention is to provide a wiper control system which provides variable intermittent timing for the rear wiper.

In order to accomplish the aforementioned and other objects, a wiper control system, according to the present invention, includes a rear wiper control circuit associated with a front wiper control circuit. The wiper drive signals generated in the front wiper control circuit are fed to the rear wiper control circuit. The rear wiper control circuit derives a rear wiper drive timing on the basis of the occurrences of the front wiper drive signals that is different fromt the drive timing of the front wiper. The rear wiper drive signal is output at the derived timing for driving the rear wiper.

In the rear wiper control of the present invention, the rear wiper driving frequency is generally lower than that of the front wiper driving frequency. The rate of the rear wiper driving frequency relative to the front wiper driving frequency is variable depending upon vehicle driving conditions.

Preferably, the wiper control system facilitates a rain condition dependent wiper control feature including a sensor for detecting rain conditions on the front windshield.

According to one aspect of the invention, a control system for automomotive windshield wiper system including a front wiper and a rear wiper, comprises a front wiper motor for driving a front wiper blade, a rear wiper motor for driving a rear wiper blade, a front wiper control circuit connected to the front wiper motor for producing a given frequency of a front wiper drive signal for driving the front wiper motor at the corresponding frequency, a rear wiper control circuit connected to the rear wiper motor and receiving the front wiper drive signal to derive a timing of the rear wiper drive signal for driving the rear wiper motor for one cycle of wiper operation by dividing frequency of the front wiper dirve signal by a given value, a vehicle speed sensor for producing a vehicle speed indicative signal having a value representative of the vehicle speed, and means, responsive to the vehicle speed indicative signal, for deriving the given value based on the vehicle speed indicative signal value.

In practice, the front wiper control circuit is operable in various operation modes including an intermittent mode, in which the front wiper drive signal is produced with a given interval for intermittent front wiper operation.

Preferably, the wiper control system further comprises a rain sensor for monitoring rain condition and producing a rain condition indicative signal, and the front wiper control circuit is responsive to the rain condition indicative signal to vary timing of the front wiper drive signal in the intermittent mode depending upon the rain condition.

The means for deriving the given value increases the given value with increasing of the vehicle speed indicative signal value. The means for deriving the given value sets the given value to one when the vehicle speed indicative signal indicates the vehicle is stopped, so that the front and rear wiper motors are driven synchroneously.

According to another aspect of the invention, a control system for an automotive windshield wiper system including a front wiper and a rear wiper, comprises a front wiper motor for driving a front wiper blade, a rear wiper motor for driving a rear wiper blade, a front wiper control circuit connected to the front wiper motor for producing a given frequency of a front wiper drive signal for driving the front wiper motor at the corresponding frequency, the front wiper control circuit being operable in an intermittent mode for producing an intermittent signal for intermittently driving the wiper motor at a predetermined interval, a rear wiper control circuit connected to the rear wiper motor and receiving the front wiper drive signal to derive a timing for generation of a rear wiper drive signal for driving the rear wiper motor for one cycle of wiper operation by dividing the frequency of the intermittent signal by a given value, a vehicle speed sensor for producing a vehicle speed indicative signal having a value representative of the vehicle speed, and means, responsive to the vehicle speed indicative signal, for deriving the given value based on the vehicle speed indicative signal value.

DESCRIPTION OF THE PREFERRED EMBODIMENT

Figure 1:
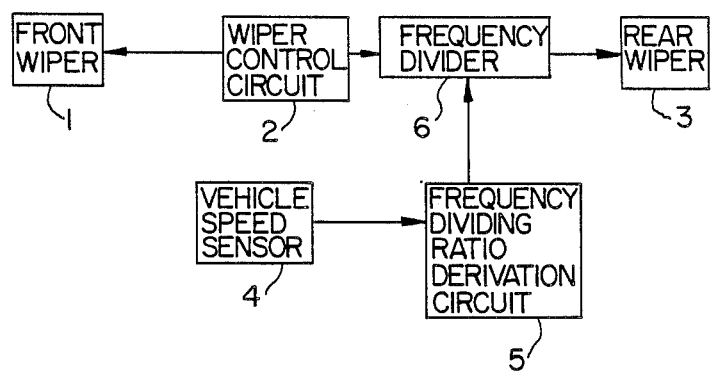
FIG. 1 is a schematic block diagram of a wiper control system according to the invention.

Referring now to the drawings, particularly to FIG. 1, the general construction of a wiper control system, according to the present invention, includes a front wiper device 1 including a front wiper motor and a rear wiper device 3 including a rear wiper motor. The front wiper device 1 is connected to a wiper control circuit 2 which has various operational modes, such as a LOW speed mode, a HIGH speed mode, an INTERMITTENT mode, a WASHER mode and an OFF mode. A manually operable mode selector switch is operable select among the various modes. The wiper control circuit 2 is connected to the front wiper device and outputs thereto a wiper drive signal of a given timing which is dependent upon the operation mode selected through the mode selector switch.

The wiper drive signal produced by the wiper control circuit 2 is of the form of a pulse train having a frequency which varies depending upon the selected operation mode. The motor of front wiper device 1 is driven by the wiper drive signal from the wiper control circuit 2 to drive a front wiper blade assembly (not shown) through one cycle of wiper operation for each pulse of the wiper drive signal.

The wiper control circuit 2 is also connected to rear wiper device 3 through a frequency divider circuit 6. The frequency divider circuit 6 receives the wiper drive signal from the wiper control circuit 2 and divides the frequency of the wiper drive signal at a given rate. The frequency divider circuit 6 thus outputs a frequency divided wiper drive signal with a lower frequency to the motor of rear wiper devices than that of the wiper drive signal of wiper control circuit 2, motor. The motor of rear wiper device 3 is driven by the wiper drive signal from the frequency divider circuit 6 to drive a rear wiper blade assembly (not shown) through one cycle of wiper operation for each pulse of the wiper drive signal. Since the frequency of the wiper drive signal applied to the motor of rear wiper device 3 is lower than that applied for the motor of front wiper device 1, the rear wiper blade assembly is driven at longer intervals than the front wiper blade assembly. Hereafter, wiper drive signal produced by the wiper control circuit will be referred to as "front wiper drive signal" and the wiper drive signal produced by the frequency divider 6 will be referred to as "rear wiper drive signal".

In the preferred embodiment, the frequency dividing ratio of frequency divider circuit 6 is variable according to vehicle speed. To adjust the frequency dividing ratio, a vehicle speed sensor 4 and a dividing ratio derivation circuit 5 are provided in the wiper system. The vehicle speed sensor 4 is of well known construction and produces a vehicle speed indicative signal. The dividing ratio derivation circuit 5 receives the vehicle speed indicative signal and derives the frequency dividing ratio. The dividing ratio derivation circuit 5 derives a greater ratio as vehicle speed increases. Based on the derived frequency dividing ratio, the dividing ratio derivation circuit 5 outputs a dividing ratio indicative signal to the frequency divider circuit 6. The frequency divider circuit 6 is responsive to the dividing ratio indicative signal to vary the frequency dividing ratio by which the frequency of the front wiper drive signal is divided to determine the rear wiper drive signal.

The dividing ratio derivation circuit 5 is responsive to the vehicle speed indicative signal indicative of a vehicle speed of zero, or substantially zero, to derive a frequency dividing ratio of one so that the front and rear wiper drive signals will have the same frequency since the amount of rain water falling on the front and rear windshields of the vehicle is not significantly different when the vehicle is not running. The dividing ratio is increased the vehicle speed increases. Therefore, the frequency of the rear wiper cycle will be reduced so that the rear wiper blade assembly will perform fewer cycles of wiper operation in a given time the front wiper blade assembly. This compensates for the difference in rain water falling on the front and rear windshields while the vehicle is running. To maintain a thin water layer on the rear windshield to allow smooth wiper operation while the vehicle is running.

Figure 2:
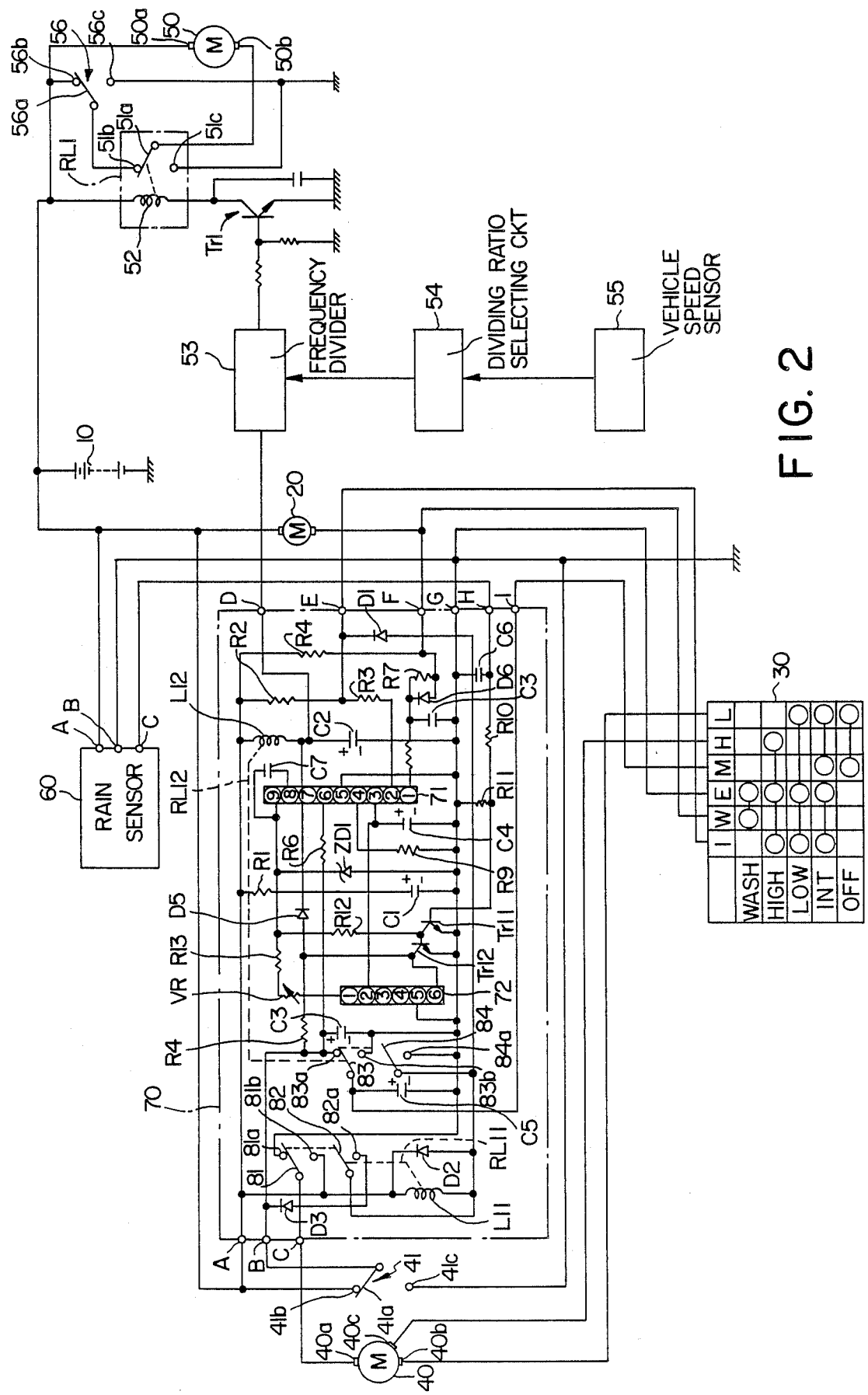
FIG. 2 is a circuit diagram of the preferred embodiment of the wiper control system according to the invention.

Referring to FIG. 2, as is well known, the wiper control system is connected to a vehicle battery 10 serving as a power source. Battery 10 is connected to the ground at its negative terminal. The wiper control system is also connected to a washer motor 20 which drives a washer pump (not shown). The washer motor 20 is connected to the positive terminal of the power source battery at one terminal and connected to the ground at the other terminal via a mode selector switch 30.

The mode selector switch 30 is a combination switch operable between an OFF mode position, an INTERMITTENT mode position, a LOW mode position, a HIGH mode position and a WASHER mode position. At the OFF mode position, terminals M and L are connected. At the INTERMITTENT mode position, the terminals I and E, and M and L are connected. At the LOW mode position, the terminals I, E and L are connected. At the HIGH mode position, terminals I, E and H are connected. At a WASHER mode position, terminals W and E are connected.

Figure 3:
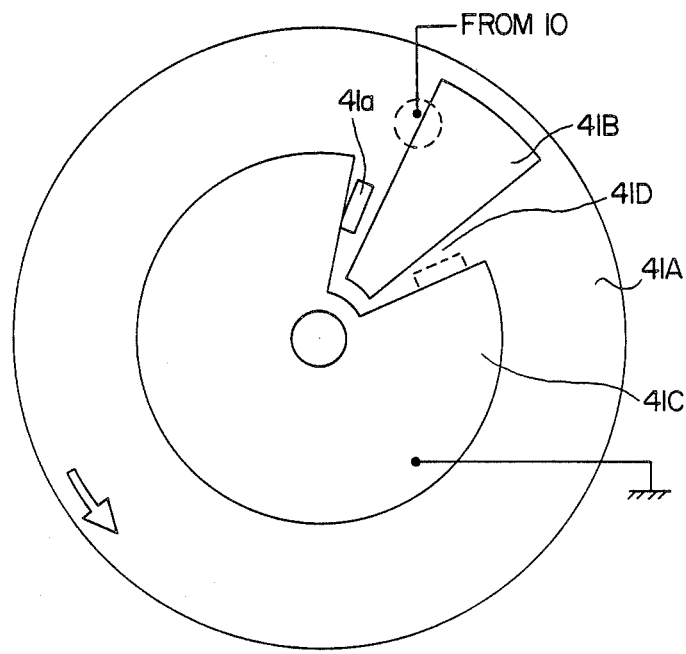
FIG. 3 is a diagramatical illustration of an AUTO-STOP switch employed in the preferred embodiment of the wiper control system of FIG. 2.

A front wiper motor 40 is provided with a power source brush 40a, a LOW speed brush 40b and a HIGH speed brush 40c. The power source brush 40a is connected to a terminal c of an intermittent control circuit 70 which will be described later. The LOW speed brush 40b is connected to the L terminal of the mode selector switch 30. HIGH speed brush 40c is connected to the H terminal of the mode selector switch 30. The front wiper motor 40 is associated with a switch 41, which is operable between ON and OFF depending upon position of a wiper blade assembly (not shown) hereafter referred to as an "AUTO-STOP switch". Though the AUTO-STOP switch 41 is illustrated as a simple switch between terminals 41a and 41b in FIG. 2, it is actually constructed as a rotary switch, as shown in FIG. 3. In FIG. 3, a rotary segment 41A is formed of a conductive material and connected to a wiper control circuit. The rotary segment 41A carrys a conductive terminal which serves as a movable contact 41a. The rotary switch also has an essentially circular stationary element 41B connected to the power source battery 10, which stationary element 41B serves as a power source terminal 41B. A circular element 41C has a cut-out 41D at a predetermined angular range. In the cut-out 41D, the power source terminal, which is formed into a fan-shaped confiquration substantially in conformance with the cut-out, is provided. The side edges of the stationary element 41B are distanced from the edges of the stationary element 41C to define small gaps. The stationary element 41C is connected to the ground, and thus serves as a grounding terminal 41c.

The movable contact 41a is associated with the front wiper blade for rotation therewith. The cut-out 41D of the stationary element 41B is located at a position corresponding to the motion end of the wiper blade assembly. While the wiper blade assembly is in the wiper cycle, the conductive terminal 41a on the rotary segment 41A is kept in contact with the stationary element 41C to connect the conductive terminal of the rotary segment 41A to the ground to maintain power supply to the front wiper motor via the wiper control circuit. At the end of a wiper cycle, the conductive terminal 41a of the rotary segment 41A comes into contact with the stationary element 41B. This connects the conductive terminal 41a of the rotary segment 41A to the power source battery 10.

A rear wiper motor 50 is connected to the positive terminal of the power source battery 10 at a power source brush 50a. The other brush 50b of the rear wiper motor 50 is connected to a movable contact 51a of a rear wiper relay $RL_1$. This rear wiper relay $RL_1$ comprises a relay coil 52, the movable contact 51a and stationary terminals 51b and 51c. This relay coil 52 is connected to the positive terminal of the power source battery 10 at one end and connected to the collector electrode of a switching transistor $Tr_1$. The emitter electrode of the switching transistor $Tr_1$ is connected to the ground. The base electrode of the switching transistor $Tr_1$ is connected to a frequency divider circuit 53. The frequency divider circuit 53 is connected to a frequency dividing ratio selector circuit 54. The frequency dividing ratio selector circuit 54 comprises a sequence circuit, for example. The frequency dividing ratio selector circuit 54 is connected to a vehicle speed sensor 55 to receive therefrom a vehicle speed indicative signal. Based on the vehicle speed indicative signal value, the frequency dividing ratio selector circuit 54 selects the frequency dividing ratio to produce a divider control signal. The frequency divider circuit 53 divides the frequency of a front wiper drive signal in the form of a pulse train from the wiper control circuit to output a rear wiper drive signal at every given number of pulses of the front wiper drive signal. By the rear wiper drive signal, the switching transistor $Tr_1$ is turned ON to connect the relay coil 52 to the ground to allow the current from the power source battery to flow therethrough. As a result, the relay coil 52 is energized to shift the movable contact 51a to contact with the terminal 51c. As a result, the brush 50b of the rear wiper motor 50 is connected to the ground. This connects the positive terminal of the power source battery 10 via the brush 50a, the rear wiper motor 50 and the brush 50b, the movable contact 51a and the terminal 51c. Therefore, the rear wiper blade assembly (not shown) is driven for one cycle of wiper operation.

The rear wiper 50 is also connected to an AUTO-STOP switch 56 having a movable contact 56a and stationary contacts 56b and 56c. Similar to the AUTO-STOP switch 41 for the front wiper motor 40, the movable contact 56a of the AUTO-STOP switch 56 is rotatable with the rear wiper motor shaft through which the rear wiper blade assembly is driven for detecting the end of each wiper cycle. While the rear wiper blade assembly is in a wiper cycle, the movable contact 51a is kept in contact with the stationary terminal 56c to connect the brush 50b of the rear wiper motor 50 via the movable contact 51a of the relay switch as shifted to contact with the stationary terminal 51b and the movable contact 56 of the AUTO-STOP switch 56 as shifted to the stationary terminal 56c. This maintains revolution of the rear wiper motor 50. At the end of the wiper cycle, the movable contact 56a is shifted to contact with the statinary terminal 56b. As a result, both brushes 50a and 50b are connected to the power source battery. This exerts armature brake on the rear wiper motor 50 to stop its revolution. As a result, the rear wiper blade assembly is stopped at a predetermined position.

Since the wiper control system facilitates rain condition dependent intermittent timing control for variable intermittent timing of the front wiper motor depending upon the rain condition, a rain sensor 60 is provided for detecting amount of rain drops to produce a rain condition indicative signal. The rain sensor 60 includes a sensor section and an amplifier circuit section. The amplifier circuit section amplifies the rain condition indicative signal. The rain sensor 60 has three terminals A, B and C.

Figure 4:
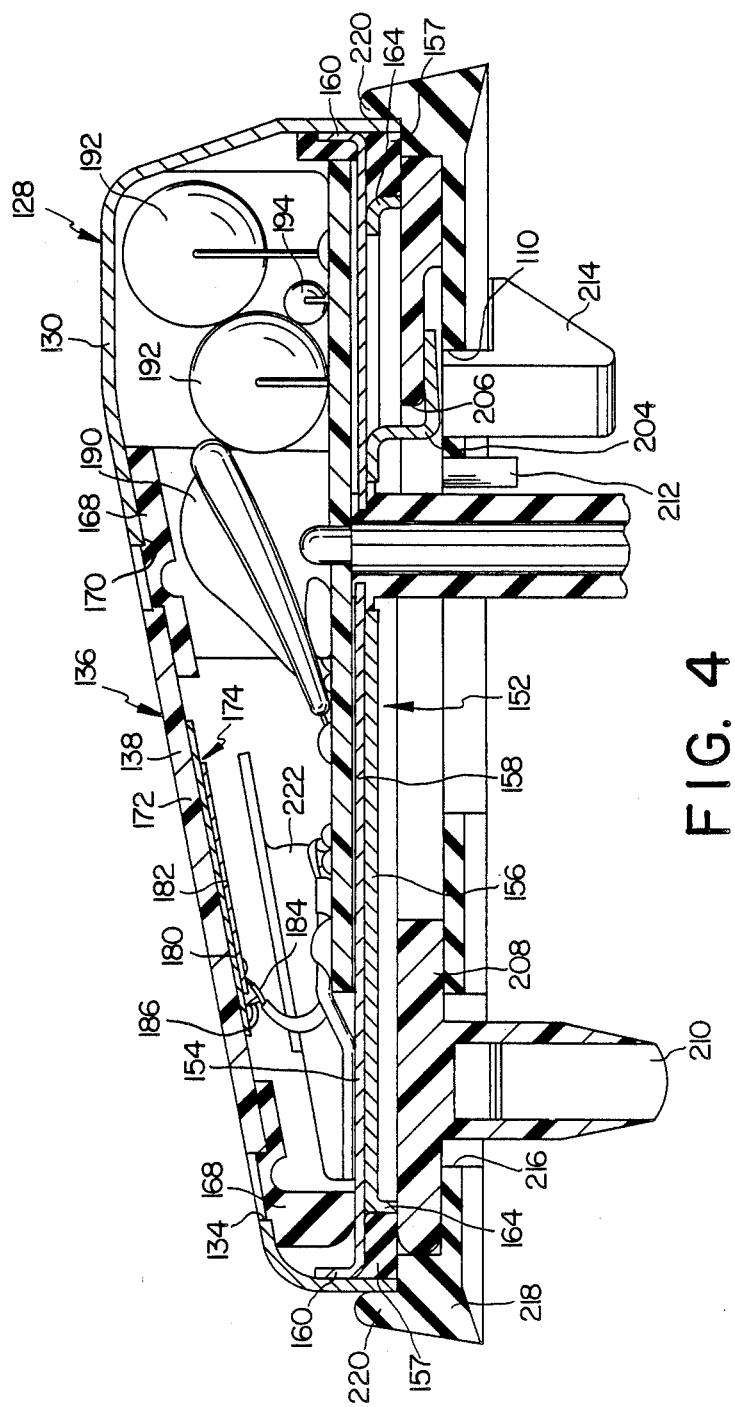
FIG. 4 is a sectional view of a rain sensor to be employed in the preferred embodiment of the wiper control system of FIG. 2.

FIG. 4 shows one example of a rain sensor. The rain sensor 60 is usually mounted on the engine hood 122 or the cowl top panel near the front windshield (not shown) in order to detect the rain condition around the windshield. A sensor casing, 128, has an upper cover member 130. The upper cover member 130 has one surface 132 tilted or inclined downwardly towards the front end of the vehicle. The tilt angle of the inclined surface 132 of the upper cover member 130 is preferably in the range of about 5° to 25°, which has been experimentarily determined to maximize sensitivity to rain conditions. A generally circular opening 134 is formed in the upper cover member 130. A vibrator 136 is elastically suspended from the sensor casing 128 to vibrate when the rain drops impinge thereupon. The vibrator 136 is adapted to produce a vibration-indicative signal, the value of which varies with the amplitude and frequency of vibration which, in turn, is dependent upon the force of impact of rain drops on the vibrator.

An upper cover member 130 of the sensor casing 128 engages a lower base member 152 to form a water-proof sensor casing. The lower base member 152 comprises a first base 154 and a second base 156. The first base 154 has a horizontal major section 158 and a circumferential flange 160 which turns upwards from the circumferential edge of the major section. The second base 156 also has a horizontal major section 162 mating with the lower surface of the major section 158 of the first base 154, and a circumferential flange 164 bent downwards bent from the circumferential edge of the major section. The mating surfaces of the first and second bases 154 and 156 are bonded together. The first and second bases 154 and 156 define a space with the upper cover member which space is filled with a sealer 157 for liquid-tight engagement between the bases and the upper cover member. An elastic rubber 168 is fitted to the lower or inner surface 170 of the upper cover member 130 around the circular opening 134. The elastic rubber is fixed to the mating surface by vulcanization. The elastic rubber also engages the flange 160 of the first base 154 to establish a water-proof seal therebetween.

As shown in FIG. 4, the vibrator 136 comprises a vibration plate 172 in the form of a circular disc and a vibration detector member 174 secured to the lower surface of the vibration plate. The vibration plate 172 has a smaller diameter than that of the circular opening 134 in the upper cover member 130. The circumferential edge of the vibration plate 172 is secured to the elastic rubber 168 by way of vulcanization so that it remains free to vibrate or oscillate in response to the impact of rain drops on the exposed surface 138.

As shown in FIG. 4, the vibration detector member 174 is attached or bonded to the lower surface of the vibration plate 172 and comprises an elastically conductive plate 180 in intimate contact with the lower surface of the vibration plate 172, and a piezoelectric element 182 attached to the conductive plate 180. The piezoelectric element 182 is bonded to the lower surface of the conductive plate 180 by means of an appropriate glue or adhesive. The conductive plate 180 and the piezoelectric element 182 are connected to the sensor circuit 140 to supply the vibration indicative signal produced in response to vibrations due to the impact of rain drops on the exposed surface 138 of the vibration plate 172, via conductive wires 184 and 186 respectively.

As shown in FIG. 4, the second base has a bent hook portion 204 engageable with an opening 206 formed in a fastener plate 208. The fastener plate 208 is provided with three hooks 210, 212 and 214 extending downwards from its lower surface. Each hook 210, 212 and 214 of the fastener plate 208 extends through a corresponding through opening 216 formed in a rubber mat 218 with a circumferential, upwardly-extending wall 220. The hooks 210, 212 and 214 are adapted to resiliently engage the vehicle body in order to secure the sensor casing 128 to the rubber mat 220 and so to the vehicle body. Alternatively, the rubber mat 220 may be elastically attached to the engine hood or cowl top panel to establish water-tight engagement therebetween. The peripheral wall 220 of the rubber mat 218 is adapted to snugly fit the outer periphery of the upper cover member 130 in order to establish a water-proof seal therebetween.

The first base 154 is bent upwards along its lateral edges to form upward extensions 222 which serve as a stopper for the vibrator to restrict its downward movement. The upper end of the upper extension 222 are accordingly positioned a given distance below the vibration plate 172. The extension 222 may prolong the life of the elastic rubber by preventing excessive downward movement of the vibration plate even when relatively strong external forces are applied thereto.

Returning to FIG. 2, the reference numeral 70 generally denotes a wiper control circuit. The wiper control circuit 70 is operable in various wiper operation modes selected through the mode selector switch 30. The wiper control circuit comprises a charge/discharge circuit and a front wiper drive signal generator circuit. The charge/discharge circuit charges to a preset value and then discharges when the voltage level reaches the preset value. The charge period required for charging potential to the preset value determines the intermittent timing in INTERMITTENT mode wiper operation. In the preferred construction, the preset value may be variable to adjust the intermittent timing. The front wiper drive signal generator circuit is responsive to a HIGH level signal discharge from the charge/discharge circuit to output the front wiper drive signal which initiates each cycle of wiper operation.

The wiper control circuit 70 includes a wiper relay $RL_{11}$ and an intermittent control relay $RL_{12}$. The wiper control circuit 70 is also provided with an IC 71 which has ports 1 through 9 and an IC 72 which has ports 1 through 6. The wiper control circuit 70 is further provided with terminals A through I respectively connected to the peripheral components of the wiper control system.

The wiper relay $RL_{11}$ has a relay coil $L_{11}$. The relay coil $L_{11}$ is associated with movable contacts 81 and 82 for operatting the latter at normal position and shifted position. At the normal position, while the relay coil $L_{11}$ is not energized the movable contact 81 is kept in contact with a stationary terminal 81a, and at the shifted position, while the relay coil $L_{11}$ is energized the movable contact is held at shifted position to contact with a stationary terminal 81b. Similarly, at the normal position, while the relay coil $L_{11}$ is not energized the movable contact 82 is kept away from a stationary terminal 82a, and at the shifted position, while the relay coil $L_{11}$ is energized the movable contact is held at shifted position to contact with a stationary terminal 82a. The intermittent control relay $RL_{12}$ has a relay coil $L_{12}$ which is associated with movable contacts 83 and 84 of relay switches. The movable contact 83 is movable between stationary terminals 83a and 83b. When the relay coil $L_{12}$ is not energized, the movable contact 83 is held in contact with the strationary terminal 83a and, when the relay coil is energized, it is shifted to contact with the stationary terminal 83b. On the other hand, the movable contact 84 is adaped to contact with a stationary terminal 84a as the relay coil $L_{12}$ is held energized. While the relay coil $L_{12}$ is denergized, the movable contact 84 is held at released position from the stationary terminal 84a.

The terminal A of the wiper control circuit is connected to the positive terminal of the power source battery 10. The terminal A is, in turn, connected to the stationary terminal 41b of the relay switch and to one end of the relay coil $L_{11}$. The other end of the relay coil $L_{11}$ is connected to the E terminal of the mode selector switch 30 via a diode $D_1$. A diode $D_2$ is provided in parallel relationship to the relay coil $L_{11}$. Furthermore, the terminal A is connected in series to the G terminal of the wiper control circuit via a resistor $R_1$ and a capacitor $C_1$. In addition, the terminal A is connected to one end of the relay coil $L_{12}$ of the intermittent control relay $RL_{12}$. The relay coil $L_{12}$ is, in turn, connected to No. 7 port of the IC 71, at the other end. Also, the other end of the relay coil $L_{12}$ is connected to the G terminal via a capacitor $C_2$. A junction between the relay coil $L_{12}$ and the capacitir $C_2$ is connected to the D terminal of the wiper control circuit.

The A terminal of the wiper control circuit is further connected to the No. 2 port of the IC 71 via resistors $R_2$ and $R_3$. A junction between the resistors $R_2$ and $R_3$ is connected to the E terminal of the mode selector switch 30. The A terminal is also connected to the F terminal of the wiper control circuit via a resistor $R_4$.

The B terminal of the wiper control circuit is connected to the stationary terminal 41a of the AUTO-STOP switch 41. The B terminal is also connected to the stationary terminal 82a of the wiper relay $RL_1$ via a diode $D_3$. The movable contact 82, which may be in or out of the contact with the stationary terminal 82a, which is connected to the E terminal of the wiper control circuit 70. The B terminal is further connected to the No 7 port of the IC circuit 71 via a series circuit including a resistor $R_5$ and the diode $D_5$. Furthermore, the B terminal of the wiper control circuit 70 is connected to the stationary terminal 83a of the relay switch in the intermittent control relay $RL_{12}$. The B terminal is also connected to the No. 6 port of the IC 71 via a resistor $R_6$ and to the terminal G of the wiper control circuit via a capacitor $C_3$.

The C terminal of the wiper control circuit 70 is connected to a power supply brush 40a of the front wiper motor 40 and to the movable contact 81 of the relay switch in the wiper relay $RL_{11}$. The D terminal of the wiper control circuit 70 is connected to the frequency divider circuit 53. The E terminal of the wiper control circuit 70 is connected to the I terminal of the mode selector switch 30. The E terminal is also connected to the movable contact 84 of the relay switch in the intermittent control relay $RL_{12}$ via a diode $D_1$. The F terminal of the wiper control circuit 70 is connected to the W terminal of the mode selector switch 30. The terminal F is also connected to the No. 1 port of the IC 71 via a series circuit of the resistor $R_7$, the diode $D_6$ and the resistor $R_8$. The G terminal of the wiper control circuit 70 is connected to the ground. Through the G terminal, a capacitor $C_3$ and the No. 5 terminal of the IC circuit 71 are connected to the ground. The capacitor $C_3$ is connected to a junction between resistors $R_7$ and $R_8$. A diode $D_6$ is provided in parallel to the resistor $R_7$. The No. 3 port of the IC circuit 71 and the No. 2 port of the IC circuit are also connected to the ground through a capacitor $C_4$ and the G terminal. The G terminal of the wiper control circuit 70 is also connected to the No. 4 port of the IC circuit 71 via a resistor $R_9$ and to the No. 5 port via a Zenor diode $ZD_1$. The G terminal is also connected to the stationary terminal 83a and the stationary terminal 84b of the relay switches in the intermittent control relay $RL_{12}$. The G terminal of the wiper control circuit 70 is connected to the movable contact 83 via a capacitor $C_5$ and the strationary terminal 81a of the relay switch in the wiper relat $RL_{11}$.

The H terminal of the wiper control circuit 70 is connected to the C terminal of the rain sensor 60 and to the G terminal via a capacitor $C_6$. The H terminal of the wiper control circuit 70 is also connected directly to the G terminal via resistors $RE_{10}$ and $R_{11}$. Via the H terminal, the C terminal of the rain sensor 60 is connected to the base electrode of a transistor $Tr_{11}$. The collector electrode of the transistor $Tr_{11}$ is connected to the base electrode of a transistor $Tr_{12}$. The collector electrode of the transistor $Tr_{12}$ is connected to the No. 6 port of the IC circuit 72. The collector electrode of the transistor $Tr_{11}$ is also connected to the No. 9 port of the IC circuit 71 via a resistor $R_{12}$. The collector electrode of the transistor $Tr_{12}$ is also connected to the No. 7 port of the IC circuit 71 via a diode $D_5$. The emittor electrodes of the transistors $Tr_{11}$ and $Tr_{12}$ are connected to the ground via the G terminal.

The I terminal of the wiper control circuit 70 is connected to the M terminal of the mode selector switch 30 and to the movable contact 83 of the relay switch in the intermittent control relay $RL_{12}$.

The No. 8 port of the IC circuit 71 is connected to the No. 9 port of the capacitor $C_7$. The No. 9 port is connected to the No. 1 port of the IC circuit 72 via a resistor $R_{13}$ and a variable resistor VR which serves as intermittent timing adjusting volume.

In operation, when the mode selector switch 30 is set at LOW speed mode position or HIGH speed mode position to drive the front wiper blade assembly continuously at a predetermined LOW or HIGH speed, a circuit including the power source battery, the relay coil $L_{11}$ of the wiper relay $RL_{11}$, the terminals I and E of the mode selector switch 30, is completed to the ground to energize the relay coil. As a result, the movable contact 81 of the relay switch of the wiper relay $RL_1$ is shifted to contact with the stationary terminal 81b. At the same time, by energization of the relay coil $L_{11}$, the movable contact 82 is shifted to contact with the stationary terminal 82a. As a result, the power supply brush 40a of the wiper motor 40 is connected to the power source battery via the terminal A of the wiper control circuit, the stationary terminal 81b, and the movable contact 81. The power source current flows through the wiper motor 40, the low or high speed brush 40b or 40c, terminal L or H, terminal E, terminal G of the wiper control circuit to the ground and the wiper motor 40 is driven at a selected low or high speed.

Since, the relay coil $L_{11}$ is energized while the mode selector switch 30 is held at LOW speed mode position or HIGH speed mode position, power is supplied to the wiper motor 40 to continuously drive the wiper motor.

If the mode selector switch 30 is placed in the OFF mode position while the front wiper blade assembly is in the intermediate position the wiper cycle, the movable contact 41a of the AUTO-STOP switch 41 is held in contact with the stationary terminal 41c connecting the stationary terminal 81a of the wiper relay $RL_{11}$ to the ground providing power to relay coil $L_{11}$, the movable contact 82, the B terminal of the wiper control circuit, the movable contact 41a of the AUTO-STOP switch and the stationary terminal 41c. Therefore, the relay coil $L_{11}$ kept energized to maintain the movable contact 81 of the relay switch of the wiper relay $RL_{11}$ in contact with the stationary terminal 81b to continue providing power to the wiper motor. Then, electric current flows through the low speed brush of the front wiper motor 40, the L and M terminals of the mode selector switch 30, the I terminal of the wiper control circuit 70, the movable contact 83 is contacting stationary terminal 83a, the movable contact 82 is shifted to contact with the stationary terminal 82a and the movable contact 41a of the AUTO-STOP switch 41 is kept in contact with the stationary terminal 41c and wiper motor 40 completes the current wiper cycle.

At the end of the wiper cycle, the movable contact 41a of the AUTO-STOP switch 41 contacts the stationary terminal 41b resulting in amerture brake of the front wiper motor 40 to stop the wiper blade assembly at the initial position.

During LOW speed or HIGH speed mode operation, the intermittent control relay $RL_{12}$ is inoperative. Therefore, the relay coil $L_{12}$ of the intermittent control relay $RL_{12}$ is deenergized and the front wiper drive signal is not output through the D terminal. Therefore, the transistor $Tr_1$ is maintained in the OFF position to keep the rear wiper motor 50 inoperative. Similarly to the foregoing LOW or HIGH speed mode operation, the power supply brush 40a of the wiper motor 40 is connected to the power source battery via the terminal A of the wiper control circuit, the stationary terminal 81b, and the movable contact 81. Therefore, power current flows through the wiper motor 40, the low speed brush 40b, and terminal L. Since the terminal L is connected to terminal M in the INTERMITTENT mode terminal L is connected to the terminal I of the wiper control circuit 70.

When the mode selector switch 30 is in the INTERMITTENT mode position, a circuit including the power source battery 10, the relay coil $L_{11}$ of the wiper relay $RL_{11}$, the E terminal of the wiper control circuit 70 and the I and E terminals of the mode selector switch 30, and the ground is established. As a result, the relay coil $L_{11}$ is energized and shifts the movable contacts 81 and 82 to contact stationary terminals 81b and 82a, respectively. At the initial stage, the capacitor $C_2$ is empty. Therefore, current flows through the relay coil $L_{12}$ and the capacitor $C_2$. As a result, the relay coil $L_{12}$ of the intermittent control relay $RL_{12}$ is energized and shifts movable contacts 83 and 84 to contact stationary terminals 83b and 84a, respectively.

As a result, the I terminal of the wiper control circuit is connected to the ground movable contact 83 is shifted to the stationary terminal 83b and the G terminal of the wiper control circuit. Therefore, the front wiper motor 40 initiates a first cycle of wiper operation.

Immediately after wiper operation is initiated, charging of capacitor $C_2$ is completed and blocks electric current to flow therethrough. This causes deenergization of the relay coil to shift the movable contacts 83 and 84 to contact stationary terminal 83a and release from stationary contact 84a, respectively. As a result, the I terminal of the wiper control system 70 is disconnected from the G terminal. At this time, since the stationary terminal 83a of the relay switch of the intermittent control relay $RL_{12}$ is connected to the stationary terminal 41c via the movable contact 41a of the AUTO-STOP switch 41, the M terminal of the mode selector switch 30 is still connected to the ground and the movable contact 83 is shofted to the stationary terminal 83a and the movable contact 41a as shifted to the stationary contact 41c. While the wiper block assembly is in the wiper cycle, this connection is maintained until the wiper operation is completed. When the wiper blade assembly reaches the motion end, the movable contact 41a is shifted to contact the stationary terminal 41b. As a result, amerture brake is applied to the wiper motor 40 and, the wiper blade is stopped at the initial position. At this position, electric current is supplied to the capacitor $C_4$ via the No. 3 port of the IC circuit 71.

The output of the rain sensor 60 is input to the wiper control circuit via the C terminal of the rain sensor circuit to the H terminal of the wiper control circuit. The output voltage of the rain sensor 60 is divided by the resistors $R_{10}$ and $R_{11}$ and supplied to the base electrode of the transistor $Tr_{11}$. This turns on the transistor $Tr_{11}$ to turn the transistor $Tr_{12}$ on. The No. 6 port of the IC circuit 72 is then connected to the ground via the emitter electrode of the transistor $Tr_{12}$ and the G terminal. The IC circuit 72 is responsive to the drop of the potential of No. 6 port to the ground level, to output charge current to the capacitor $C_4$ via the No. 2 port. Since the frequency of the charge current occurrence through the No. 2 port is variable, depending upon the frequency of the rain condition signal from the rain sensor, it is facilitated with rain condition dependent intermittent control.

While the capacitor $C_4$ is not fully charged, the potential at the No 7 port of the IC 71 is held HIGH to block the current flowing through the relay coil $L_{12}$ of the intermittent control relay $RL_{12}$. Therefore, the relay coil $L_{12}$ is held deenergized to maintain the movable contact 83 in contact with the stationary contact 83a and the movable contact 84 away from the stationary contact 84a. When the capacitor $C_4$ is fully charged, the potential at the No. 7 port of the IC 7 drops to the ground level. Thus, the relay coil $L_{12}$ is energized to again shift movable contacts 83 and 84 to contact stationary terminals 83b and the 84a, respectively. As a result, the power supply circuit for the front wiper motor 40 is completed to initiate wiper operation. Shortly after initiating the wiper motor revolution, the potential at the port 7 of the IC circuit 71 turns into HIGH level to again block current from flowing through the relay coil $L_{12}$. Therefore, the relay coil $L_{12}$ is deenergized to shift the movable contact 83 into contact with the stationary terminal 83a and the movable contact 84 away from the stationary contact 84a. At the same time, the movable contact 41a of the AUTO-STOP switch 41 establishes contact with the stationary terminal 41c. Therefore, a power supply circuit for the front wiper motor 40 is maintained.

Everytime the relay coil $L_{12}$ is energized in response to drop of the potential at the No. 7 port to the ground level, a HIGH level signal appreas at the D terminal of the wiper control circuit 70. The frequency of the HIGH level signal at the D terminal is divided by N. The value N is determined by the frequency dividing ration selector circuit. Namely, the frequency divider circuit 53 outputs HIGH level signal every N-times the HIGH level signal at the D terminal of the wiper control circuit 70 occurs.

The HIGH level output of the frequency divider circuit 53 is supplied to the base electrode of the transistor Tr₁ to connect the relay coil 52 to the ground. This energizes the relay coil 52 to shift the movable contact 51a of the relay switch RL₁ to contact the stationary terminal 51c. Therefore, the power supply circuit through battery 10, the brush 50a, wiper motor 50, the brush 50b, the movable contact 51a, the stationary terminal 51c and the ground, is established to initiate one cycle of rear wiper operation. Immediately after starting rear wiper operation, the output level of the frequency divider drops to LOW level in synchronizm with rising of the potential at the No. 7 port of the IC circuit 71. Therefore, the relay coil 52 is deenergized to shift the movable contact 51a to contact with the stationary terminal 51b. At this time, since the rear wiper blade assembly is already in the wiper cycle, the movable contact 56a of the AUTO-STOP switch 56 is in contact with the stationary terminal 56c to connect the brush 50b of the wiper motor to the ground. Therefore, the rear wiper motor 50 continues revolution until the current cycle of wiper operation is completed.

At the end of the wiper cycle, the movable contact 56a of the AUTO-STOP switch is switched into contact with the stationary terminal 56b. This applies amerture brake to the rear wiper motor 50.

Since the frequency dividing ration selector circuit 54 is responsive to the vehicle speed signal to derive the frequency dividing ratio N, the intermittent timing will be variable depending upon the vehicle speed. Namely, an increase of vehicle speed reduces the amount of rain water adhering on the rear windshield because of the stronger wind flowing over the vehicle body. Therefore, the rear wiper blade assembly should to be driven at a lower frequency at higher vehicle speed. Therefore, the value N should be increased with increasing vehicle speed. On the other hand, the value N should be reduced to 1 as the vehicle speed is decreased. When the vehicle is at rest, the value N is set to 1 (one) to set the rear wiper frequency identical to that of the front wiper.

It would be, off course, possible to make the rear wiper system operative even in LOW speed mode and HIGH speed mode front wiper operation. In such case, the frequency of occurence of rear wiper operation may be adjusted depending upon the vehicle speed. However, in the preferred embodiment of the wiper control system above, since the front wiper is controlled depending upon rain condition by the rain sensor and the front wiper driven in a substantially continuous manner when the rain is relatively heavy, it would be unnecessary operate this rear wiper operation in a continuous mode. In a practical embodiment, the frequency of front wiper operation in the INTERMITTENT mode can be varied over a range of 5 to 58-times per minute. Since the frequency of wiper operation at LOW speed mode is also normally 58-times per minute the same frequency of wiper operation is obtained in INTERMITTEN mode when the rain is heavy or the vehicle speed is high.

Though the embodiment has been directed to the wiper control system including the rain sensor, the present invention is applicable to any wiper system for controlling intermittent timing of the rear wiper system.

What is claimed is:

1. A control system for an automotive wiper system including a front wiper and a rear wiper, comprising:
   a front wiper motor for driving a front wiper blade;
   a rear wiper motor for driving a rear wiper blade;
   a front wiper control circuit connected to said front wiper motor for producing a front wiper drive signal having a given frequency for driving said front wiper motor at said given frequency;
   a rear wiper control circuit connected to said rear wiper motor for receiving said front wiper drive signal, and for dividing the frequency of said front wiper drive signal by a given value and generating a rear wiper drive signal for driving said rear wiper motor;
   a vehicle speed sensor for producing a vehicle speed indicative signal having a value representative of the vehicle speed; and
   means, responsive to said vehicle speed indicative signal, for deriving said given value based on the vehicle speed indicative signal value.

2. A control system as set forth in claim 1, wherein said front wiper control circuit is operable in various operation modes including an intermittent mode, in which said front wiper drive signal is produced with a given interval for intermittent front wiper operation.

3. A control system as set forth in claim 2, which further comprises a rain sensor for monitoring rain condition and producing a rain condition indicative signal, said front wiper control circuit is responsive to said rain condition indicative signal to vary the interval of said front wiper drive signal in said intermittent mode depending upon the rain condition.

4. A control system as set forth in claim 1 including means for deriving said given value, wherein said deriving means increases said given value as the vehicle speed indicative signal value increases.

5. A control system as set forth in claim 4, wherein said means for deriving said given value sets said given value to one when said vehicle speed indicative signal indicates the vehicle is stopped, so that said front and rear wiper motors are driven synchroneously to each other.

6. A control system as set forth in claim 5, wherein said front wiper control circuit is operable in various operation modes including an intermittent mode, in which said front wiper drive signal is produced with a given interval for intermittent front wiper operation.

7. A control system as set forth in claim 6, which further comprises a rain sensor for monitoring rain condition and producing a rain condition indicative signal, said front wiper control circuit is responsive to said rain condition indicative signal to vary the interval of said front wiper drive signal in said intermittent mode depending upon the rain condition.

8. A control system as set forth in claim 7, wherein said rear wiper control circuit is active while said front wiper control circuit is in operation in said intermittent mode, for outputting said rear wiper drive signal.

9. A control system for an automotive wiper system including a front wiper and a rear wiper, comprising:
   a front wiper motor for driving a front wiper blade;
   a rear window motor for driving a rear wiper blade;
   a front wiper control circuit connected to said front wiper motor for producing a front wiper drive signal having a given frequency for driving said front wiper motor at said given frequency, said front wiper control circuit being operable in an intermittent mode for producing an intermittent signal for intermittently driving said front wiper motor with a predetermined interval;

a rear wiper control circuit connected to said rear wiper motor for receiving said front wiper drive signal, and for dividing the frequency of said front wiper drive signal by a given value and generating a rear wiper drive signal for driving said rear wiper motor;

a vehicle speed sensor for producing a vehicle speed indicative signal having a value representative of the vehicle speed; and means, responsive to said vehicle speed indicative signal, for deriving said given value based on the vehicle speed indicative signal value.

10. A control system as set forth in claim 9, wherein said means for deriving said given value increases said given value as the vehicle speed indicative signal value increases.

11. A control system as set forth in claim 10, wherein said means for deriving said given value set said given value to one when said vehicle speed indicative signal indicates the vehicle is stopped, so that said front and rear wiper motors are driven synchroneously to each other.

* * * * *

UNITED STATES PATENT AND TRADEMARK OFFICE
CERTIFICATE OF CORRECTION

PATENT NO.   : 4,881,019
DATED        : November 14, 1989
INVENTOR(S)  : Shiraishi et al.

It is certified that error appears in the above-identified patent and that said Letters Patent is hereby corrected as shown below:

On the title page:

[73] Assignee:  Nissan Motor Co., Ltd.; Japan and
                Jidosha Denki Kogyo Kabushiki Kaisha; Japan Signed and Sealed this Fourth Day of June, 1991

Attest:

HARRY F. MANBECK, JR.

Attesting Officer

Commissioner of Patents and Trademarks